(12) United States Patent
Kyushima et al.

(10) Patent No.: US 8,189,084 B2
(45) Date of Patent: May 29, 2012

(54) SOLID STATE IMAGING DEVICE

(75) Inventors: Ryuji Kyushima, Hamamatsu (JP);
Harumichi Mori, Hamamatsu (JP);
Junichi Sawada, Hamamatsu (JP);
Kazuki Fujita, Hamamatsu (JP);
Masahiko Honda, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 246 days.

(21) Appl. No.: 12/676,282

(22) PCT Filed: Sep. 3, 2008

(86) PCT No.: PCT/JP2008/065893
§ 371 (c)(1),
(2), (4) Date: Apr. 2, 2010

(87) PCT Pub. No.: WO2009/031585
PCT Pub. Date: Mar. 12, 2009

(65) Prior Publication Data
US 2010/0194937 A1   Aug. 5, 2010

(30) Foreign Application Priority Data

Sep. 5, 2007   (JP) .............................. P2007-230538

(51) Int. Cl.
*H04N 5/335*   (2006.01)
(52) U.S. Cl. ...................................... 348/294
(58) Field of Classification Search .................. 348/294
See application file for complete search history.

(56) References Cited

U.S. PATENT DOCUMENTS

| 6,792,159 | B1 | 9/2004 | Aufrichtig et al. |
| 2005/0145903 | A1* | 7/2005 | Ishii et al. .................... 257/291 |

FOREIGN PATENT DOCUMENTS

| JP | 2000-46645 | 2/2000 |
| JP | 2003-296722 | 10/2003 |
| JP | 2005-210164 | 8/2005 |
| JP | 2006-211069 | 8/2006 |
| JP | 2006-234557 | 9/2006 |
| WO | WO 00/50879 | 8/2000 |

* cited by examiner

Primary Examiner — James Hannett
(74) Attorney, Agent, or Firm — Drinker Biddle & Reath LLP

(57) ABSTRACT

A solid state imaging device 1 includes a photodetecting section 10, a signal readout section 20, a controlling section 30, and a correction processing section 40. In the photodetecting section 10, M×N pixel portions each including a photodiode which generates charges as much as an incident light intensity and a readout switch connected to the photodiode are two-dimensionally arrayed in M rows and N columns. Charges generated in each pixel portion $P_{m,n}$ are input into an integration circuit $S_n$ through a readout wiring $L_{O,n}$, and a voltage value output corresponding to the charge amount from the integration circuit $S_n$ is output to an output wiring $L_{out}$ through a holding circuit $H_n$. In the correction processing section 40, correction processing is performed for frame data repeatedly output from the signal readout section 20, and frame data after being subjected to the correction processing is output.

9 Claims, 7 Drawing Sheets

SOLID STATE IMAGING DEVICE

TECHNICAL FIELD

The present invention relates to a solid state imaging device.

BACKGROUND ART

As a solid state imaging device, those using the CMOS technique are known, and among these, a passive pixel sensor (PPS) type is known (refer to Patent Document 1). The PPS type solid state imaging device includes PPS type pixel portions including photodiodes for generating charges as much as incident light intensities, two-dimensionally arrayed in M rows and N columns, and charges generated in the photodiode in each pixel portion according to light incidence are accumulated in a capacitive element in an integration circuit, and a voltage corresponding to the accumulated charge amount is output.

Generally, output terminals of M pixel portions in each column are connected to an input terminal of an integration circuit provided corresponding to the column via a readout wiring provided corresponding to the column. Then, from the respective first to M-th rows, charges generated in the photodiodes of the pixel portions are input in order into the corresponding integration circuits through the corresponding readout wirings, and voltage values corresponding to the charge amounts are output from the integration circuits.

The PPS type solid state imaging device is used for various purposes, and is combined with, for example, a scintillator panel and used as an X-ray flat panel for medical purposes and industrial purposes, and in detail, it is also used in an X-ray CT apparatus and a microfocus X-ray examination apparatus, etc. The solid state imaging device to be used for these purposes has a large-area photodetecting section in which M×N pixel portions are two-dimensionally arrayed, and may be integrated on a semiconductor substrate having a large size with sides more than 10 centimeters. Therefore, only one solid state imaging device may be produced from one semiconductor wafer.

Patent Document 1: Japanese Published Unexamined Patent Application No. 2006-234557

DISCLOSURE OF THE INVENTION

Problem to be Solved by the Invention

In the solid state imaging device described above, when a readout wiring corresponding to any of the columns is broken during production, pixel portions closer to the integration circuit than the broken point among the M pixel portions of the column are connected to the integration circuit by the readout wiring, however, pixel portions farther from the integration circuit than the broken point are not connected to the integration circuit. Therefore, charges generated in the photodiodes according to light incidence in the pixel portions farther from the integration circuit than the broken point are not read out to the integration circuit, and are just accumulated in a junction capacitance portion of the corresponding photodiode.

When the amount of charges accumulated in the junction capacitance portion of the photodiode exceeds a saturation level, charges over the saturation level overflow to the neighboring pixel portions. Therefore, when one readout wiring is broken, this influences not only the pixel portions of the column connected to this readout wiring but also pixel portions of neighboring columns on both sides of the column in question, and eventually, defective lines occur with pixel portions of three consecutive columns.

When defective lines are not consecutive and the neighboring lines of one defective line are normal, pixel data of the defective line can be interpolated by using pixel data of the normal neighboring lines. However, when defective lines occur with pixel portions in three consecutive columns, the above-described interpolation is difficult. Particularly, in a solid state imaging device including a large-area photodetecting section as described above, the probability that a wire is broken increases due to the long length of the readout wirings.

Patent Document 1 proposes an invention made for solving this problem. In this invention, an average of all pixel data of neighboring line neighboring a defective line is obtained, and also, an average of all pixel data of further neighboring several normal lines is obtained, and when a difference between these two averages is not less than a predetermined value, the neighboring line is also determined as defective and pixel data of the neighboring line is corrected, and further, based on the values after being corrected of the pixel data of the neighboring line, pixel data of the defective line is corrected.

In the invention described in Patent Document 1, when correcting the pixel data of the neighboring line determined as defective, an average of two pixel data on normal lines on both sides of and nearest the neighboring line is obtained, and this average is set as pixel data of the neighboring line. When correcting the pixel data of the defective line, an average of two pixel data on neighboring lines on both sides of the defective line is obtained, and this average is set as pixel data of the defective line.

However, in the invention described in Patent Document 1, processing of obtaining an average of two pixel data is repeated a plurality of times to correct pixel data of a defective line (and a line near the defective line and determined as defective), so that the resolution lowers near the defective line in a corrected image.

The present invention was made to solve the above-described problems, and an object thereof is to provide a solid state imaging device which can obtain an image with high resolution by correcting pixel data when any of the readout wirings is broken.

Means for Solving the Problem

A solid state imaging device of the present invention includes:

(1) a photodetecting section including M×N pixel portions $P_{1,1}$ to $P_{M,N}$ two-dimensionally arrayed in M rows and N columns, each including a photodiode which generates charges as much as an incident light intensity and a readout switch connected to the photodiode; (2) a readout wiring $L_{O,n}$, which is connected to readout switches included in the M pixel portions $P_{1,n}$ to $P_{M,n}$ of the n-th column in the photodetecting section, and reads out charges generated in a photodiode included in any of the M pixel portions $P_{1,n}$ to $P_{M,n}$ via the readout switch included in the pixel portion; (3) a signal readout section which is connected to readout wirings $L_{O,1}$ to $L_{O,N}$, holds voltage values corresponding to charges input through the readout wirings $L_{O,n}$, and successively outputs the held voltage values; and (4) a controlling section which controls opening and closing operations of readout switches included in N pixel portions $P_{m,1}$ to $P_{m,N}$ of the m-th row in the photodetecting section, controls voltage value output operations in the signal readout section, and makes the signal readout section repeatedly output voltage values corresponding to the amounts of charges generated in the photodiodes included in the M×N pixel portions $P_{1,1}$ to $P_{M,N}$ in the photodetecting section as frame data. M and N are integers not less than 2, and m is integers not less than 1 and not more than M, and n is integers not less than 1 and not more than N.

The solid state imaging device of the present invention further includes, in addition to the photodetecting section, the readout wiring $L_{O,n}$, the signal readout section, and the controlling section, a correction processing section which acquires respective frame data repeatedly output from the signal readout section and applies correction processing thereto. A frame data correction method of the present invention is a method for correcting frame data output from the solid state imaging device including the photodetecting section, the readout wiring $L_{O,n}$, the signal readout section, and the controlling section.

When any readout wiring $L_{O,n1}$ of the n1-th column among the readout wirings $L_{O,1}$ to $L_{O,N}$ is broken, the correction processing section included in the solid state imaging device of the present invention or the frame data correction method of the present invention: (a) defines a pixel portion which is not connected to the signal readout section due to the breakage of the readout wiring $L_{O,n1}$ among M pixel portions $P_{1,n1}$ to $P_{M,n1}$ of the n1-th column as a pixel portion $P_{m1,n1}$, and defines a pixel portion neighboring the pixel portion $P_{m1,n1}$ in the n2-th column neighboring the n1-th column as a pixel portion $P_{m1,n2}$; (b) corrects a voltage value $V_k$ corresponding to the pixel portion $P_{m1,n2}$ in frame data $F_k$ output k-th from the signal readout section based on voltage values $V_k$, $V_{k-1}$, and $V_{k-2}$ corresponding to the same pixel portion $P_{m1,n2}$ in the frame data $F_k$ and at least two frame data $F_{k-1}$ and $F_{k-2}$ just before the frame data $F_k$; and (c) determines a voltage value corresponding to the pixel portion $P_{m1,n1}$ in the frame data $F_k$ based on a value after being corrected of the voltage value corresponding to the pixel portion $P_{m1,n2}$. Here, m1 is an integer not less than 1 and not more than M, n1 and n2 are integers not less than 1 and not more than N, and k is an integer.

According to the present invention, when any readout wiring $L_{O,n1}$ of the n1-th column among readout wirings $L_{O,1}$ to $L_{O,N}$ is broken, a pixel portion which is not connected to the signal readout section due to the breakage of the readout wiring $L_{O,n1}$ among M pixel portions $P_{1,n1}$ to $P_{M,n1}$ of the n1-th column is defined as a pixel portion $P_{m1,n1}$, and a pixel portion neighboring the pixel portion $P_{m1,n1}$ in the n2-th column neighboring the n1-th column is defined as a pixel portion $P_{m1,n2}$. Then, a voltage value $V_k$ corresponding to the pixel portion $P_{m1,n2}$ in frame data $F_k$ output k-th from the signal readout section is corrected based on voltage values $V_k$, $V_{k-1}$, and $V_{k-2}$ corresponding to the same pixel portion $P_{m1,n2}$ in the frame data $F_k$ and at least two frame data $F_{k-1}$ and $F_{k-2}$ just before the frame data $F_k$. Thereafter, a voltage value corresponding to the pixel portion $P_{m1,n1}$ in the frame data $F_k$ is determined based on a value after being corrected of the voltage value corresponding to the pixel portion $P_{m1,n2}$.

Thus, when correcting the voltage value $V_k$ corresponding to the pixel portion $P_{m1,n2}$ on the readout wiring $L_{O,n}2$ of the n2-th column neighboring the broken readout wiring $L_{O,n1}$ of the n1-th column, it is not necessary to use a voltage value corresponding to the pixel portion on a normal line. Therefore, in the present invention, the resolution near a defective line in an image after being corrected becomes higher than in the invention described in Patent Document 1.

The correction processing section included in the solid state imaging device of the present invention or the frame data correction method of the present invention preferably performs processing of subtracting values obtained by multiplying the voltage values $V_k$, $V_{k-1}$, and $V_{k-2}$ by coefficients from the voltage value $V_k$ corresponding to the pixel portion $P_{m1,n2}$ in the frame data $F_k$ as processing to correct the voltage value $V_k$.

The correction processing section included in the solid state imaging device of the present invention or the frame data correction method of the present invention preferably corrects the voltage value $V_k$ corresponding to the pixel portion $P_{m1,n2}$ in the frame data $F_k$ by setting the coefficients for each of any plurality of readout wirings among the readout wirings $L_{O,1}$ to $L_{O,N}$ when the plurality of readout wirings are broken.

When the solid state imaging device includes a plurality of pairs of photodetecting sections and signal readout sections, the correction processing section included in the solid state imaging device of the present invention or the frame data correction method of the present invention preferably obtains the coefficients, when a readout wiring of any of the columns included in any of the plurality of photodetecting sections is broken, based on voltage values of frame data corresponding to the photodetecting section.

An X-ray CT device of the present invention includes: (1) an X-ray output section which outputs X-rays toward a subject; (2) the solid state imaging device described above of the present invention which receives and images X-rays output from the X-ray output section and reaching through the subject; (3) a moving means for moving the X-ray output section and the solid state imaging device relative to the subject; and (4) an image analysis section which inputs frame data after being corrected output from the solid state imaging device and generates a tomographic image of the subject based on the frame data.

Effect of the Invention

According to the present invention, when any readout wiring is broken, an image with high resolution can be obtained by correcting pixel data.

Figure 1:
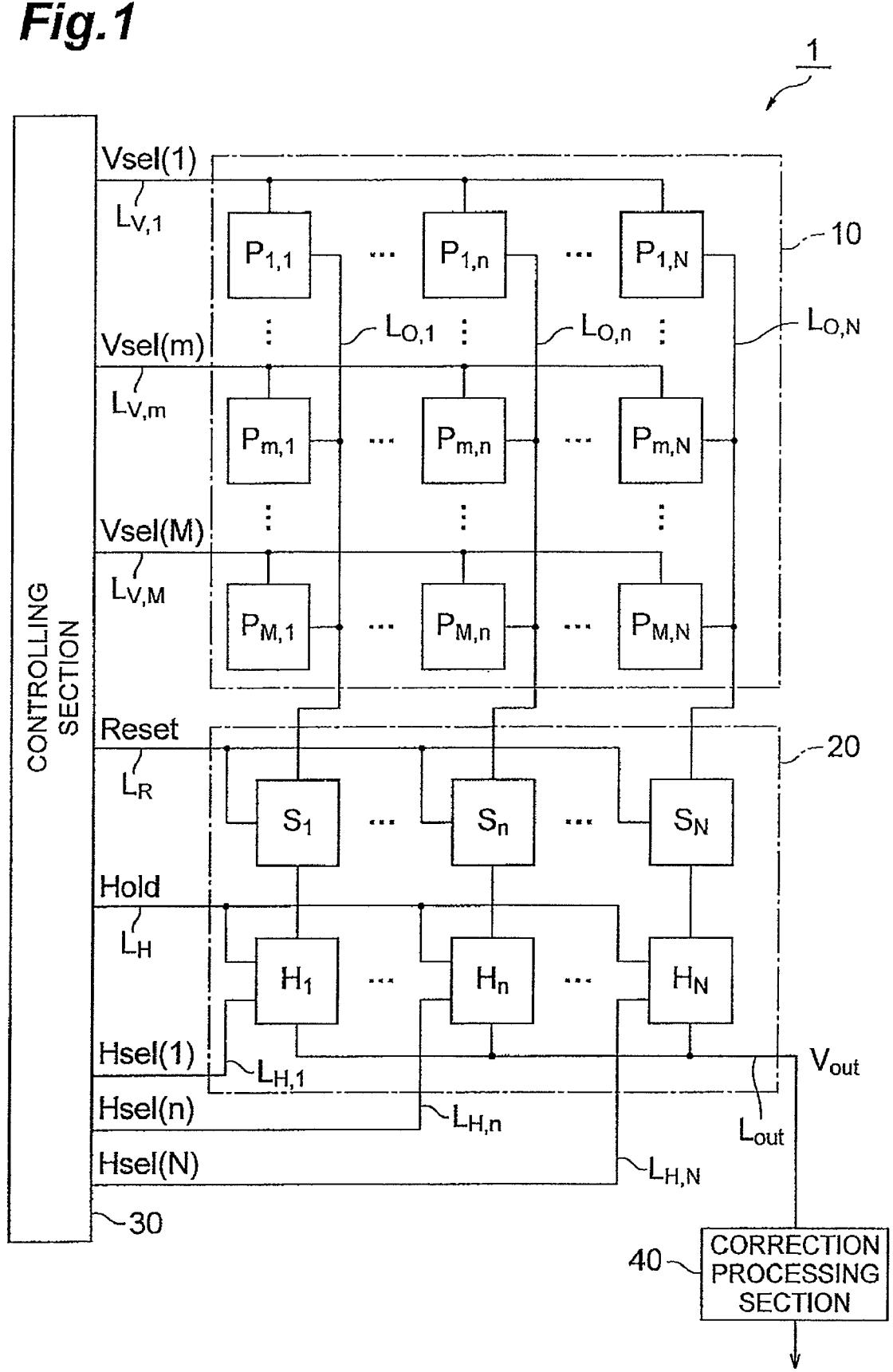
FIG. 1 is a schematic configuration view of a solid state imaging device 1 of the present embodiment.

DESCRIPTION OF REFERENCE NUMERALS 1, 2: Solid state imaging device
10, 10A, 10B: Photodetecting section
20, 20A, 20B: Signal readout section
30: Controlling section
40: Correction processing section
$P_{1,1}$ to $P_{M,N}$: Pixel portion PD: Photodiode
SW$_1$: Readout switch
S$_1$ to S$_N$: Integration circuit
C$_2$: Integrating capacitive element
SW$_2$: Discharge switch
A$_2$: Amplifier
H$_1$ to H$_N$: Holding circuit
C$_3$: Holding capacitive element
SW$_{31}$: Input switch
SW$_{32}$: Output switch
L$_{V,m}$: m-th row selection wiring
L$_{H,n}$: n-th column selection wiring
L$_{O,n}$: n-th column readout wiring
L$_R$: Discharge wiring
L$_H$: Holding wiring
L$_{out}$: Voltage output wiring

BEST MODES FOR CARRYING OUT THE INVENTION

Hereinafter, a best mode for carrying out the present invention will be described with reference to the accompanying drawings. In the description of the drawings, the same components will be designated with the same reference numerals, and overlapping description will be omitted.

FIG. 1 is a schematic configuration view of a solid state imaging device 1 of a present embodiment. The solid state imaging device 1 of the present embodiment includes a photodetecting section 10, a signal readout section 20, a controlling section 30, and a correction processing section 40. When it is used as an X-ray flat panel, a scintillator panel is overlaid on the photodetecting section 10 of the solid state imaging device 1.

The photodetecting section 10 includes M×N pixel portions P$_{1,1}$ to P$_{M,N}$ two-dimensionally arrayed in M rows and N columns. A pixel portion P$_{m,n}$ is positioned on the m-th row in the n-th column. Here, M and N are integers not less than 2, and m is integers not less than 1 and not more than M, and n is integers not less than 1 and not more than N. The pixel portions P$_{m,n}$ are a PPS type, and have a common configuration.

N pixel portions P$_{m,1}$ to P$_{m,N}$ of the m-th row are connected to the controlling section 30 by an m-th row selection wiring L$_{v,m}$. Output terminals of M pixel portions P$_{1,n}$ to P$_{M,n}$ of the n-th column are connected to an integration circuit S$_n$ included in the signal readout section 20 by an n-th column readout wiring L$_{O,n}$.

The signal readout section 20 includes N integration circuits S$_1$ to S$_N$ and N holding circuits H$_1$ to H$_N$. The integration circuits S$_n$ have a common configuration. The holding circuits H$_n$ have a common configuration.

Each integration circuit S$_n$ has an input terminal connected to the readout wiring L$_{O,n}$, and accumulates charges input in this input terminal and outputs a voltage value corresponding to the accumulated charge amount from an output terminal to the holding circuit H$_n$. N integration circuits S$_1$ to S$_N$ are connected to the controlling section 30 by a discharge wiring L$_R$.

Each holding circuit H$_n$ has an input terminal connected to the output terminal of the integration circuit S$_n$, and holds a voltage value input in this input terminal and outputs the held voltage value from an output terminal to the output wiring L$_{out}$. N holding circuits H$_1$ to H$_N$ are connected to the controlling section 30 by a holding wiring L$_H$. Each holding circuit H$_n$ is connected to the controlling section 30 by an n-th column selection wiring L$_{H,n}$.

The controlling section 30 outputs an m-th row selecting control signal Vsel(m) to an m-th row selection wiring L$_{V,m}$ to supply this m-th row selecting control signal Vsel(m) to N pixel portions P$_{m,1}$ to P$_{m,N}$ of the m-th row. M row selecting control signals Vsel(1) to Vsel(M) are successively set to significant values. The controlling section 30 includes a shift register for successively setting the M row selecting control signals Vsel(1) to Vsel(M) to significant values and outputting them.

The controlling section 30 outputs an n-th column selecting control signal Hsel(n) to an n-th column selection wiring L$_{H,n}$ to supply this n-th column selecting control signal Hsel(n) to the holding circuit H$_n$. N column selecting control signals Hsel(1) to Hsel(N) are also successively set to significant values. The controlling section 30 includes a shift register for successively setting the N column selecting control signals Hsel(1) to Hsel(N) to significant values and outputting them.

The controlling section 30 outputs a discharging control signal Reset to the discharge wiring L$_R$ to supply this discharging control signal Reset to the N integration circuits S$_1$ to S$_N$. The controlling section 30 outputs a holding control signal Hold to the holding wiring L$_H$ to supply this holding control signal Hold to the N holding circuits H$_1$ to H$_N$.

As described above, the controlling section 30 controls opening and closing operations of readout switches SW$_1$ included in N pixel portions P$_{m,1}$ to P$_{m,N}$ of the m-th row in the photodetecting section 10, and controls voltage value holding operations and output operations in the signal readout section 20. Accordingly, the controlling section 30 makes the signal readout section 20 repeatedly output voltage values corresponding to amounts of charges generated in photodiodes PD included in M×N pixel portions P$_{1,1}$ to P$_{M,N}$ in the photodetecting section 10 as frame data.

The correction processing section 40 acquires respective frame data repeatedly output from the signal readout section 20 and applies correction processing thereto, and outputs frame data after being subjected to correction processing. The details of the correction processing in the correction processing section 40 will be described in detail later.

Figure 2:
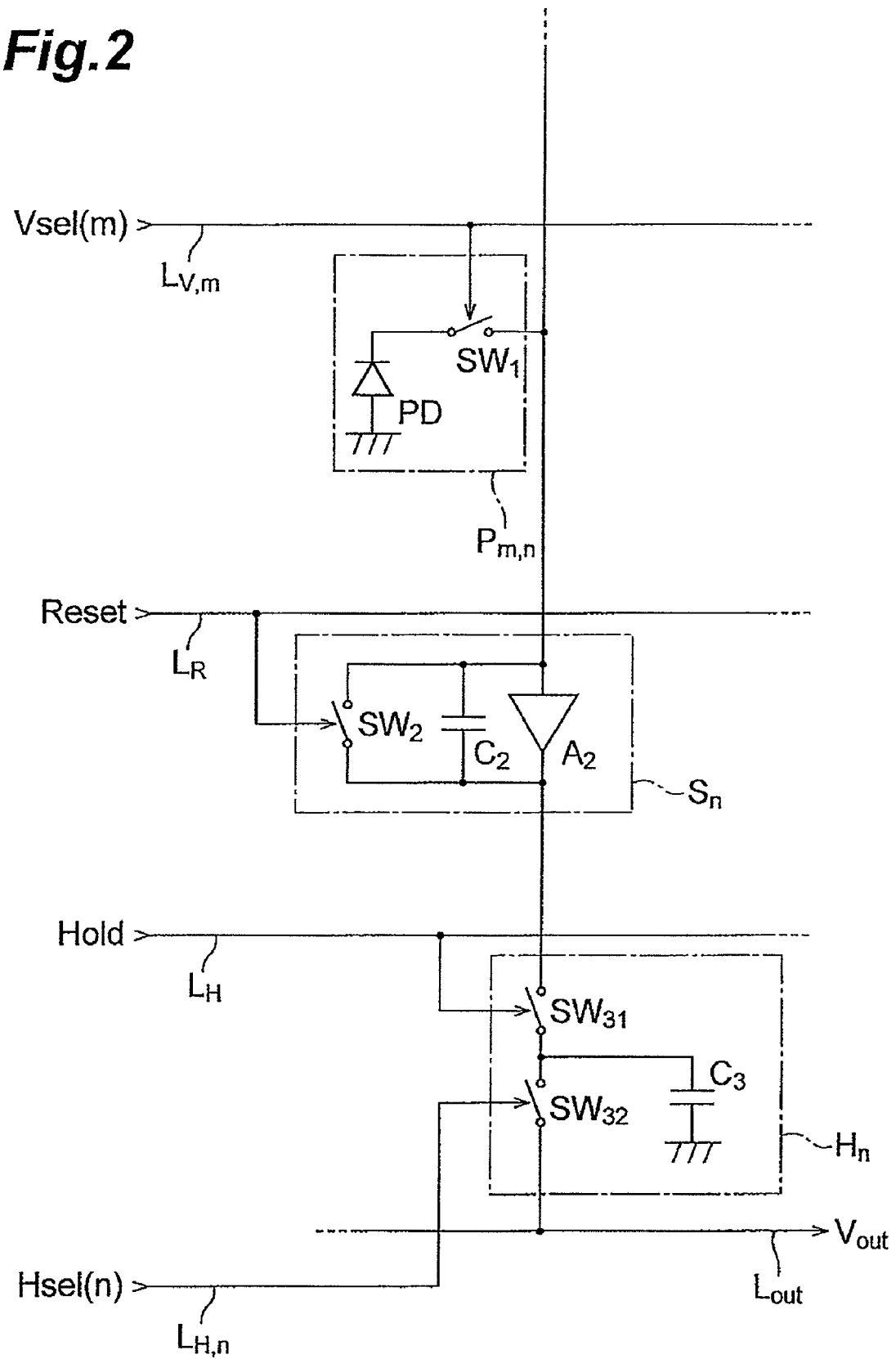
FIG. 2 is a circuit diagram of a pixel portion $P_{m,n}$, an integration circuit $S_n$, and a holding circuit $H_n$ included in the solid state imaging device 1 of the present embodiment.

FIG. 2 is a circuit diagram of a pixel portion P$_{m,n}$, an integration circuit S$_n$, and a holding circuit H$_n$ included in the solid state imaging device 1 of the present embodiment. Here, a circuit diagram of a pixel portion P$_{m,n}$ as a representative of the M×N pixel portions P$_{1,1}$ to P$_{M,N}$ is shown, a circuit diagram of an integration circuit S$_n$ as a representative of the N integration circuits S$_1$ to S$_N$ is shown, and a circuit diagram of a holding circuit H$_n$ as a representative of the N holding circuits H$_1$ to H$_N$ is shown. That is, circuit portions concerning a pixel portion P$_{m,n}$ on the m-th row in the n-th column and the n-th column readout wiring L$_{O,n}$ are shown.

The pixel portion P$_{m,n}$ includes a photodiode PD and a readout switch SW$_1$. The anode terminal of the photodiode PD is grounded, and the cathode terminal of the photodiode PD is connected to the n-th column readout wiring L$_{O,n}$ via the readout switch SW$_1$. The photodiode PD generates charges as much as incident light intensity, and accumulates the generated charges in a junction capacitance portion. The readout switch SW$_1$ is supplied with an m-th row selecting control signal which passed through the m-th row selection wiring L$_{V,m}$ from the controlling section 30. The m-th row selecting control signal instructs opening and closing operations of the readout switches SW$_1$ included in N pixel portions P$_{m,1}$ to P$_{m,N}$ of the m-th row in the photodetecting section 10.

In this pixel portion P$_{m,n}$, when the m-th row selecting control signal Vsel(m) is at low level, the readout switch SW$_1$ opens, and charges generated in the photodiode PD are not output to the n-th column readout wiring $L_{O,n}$ but are accumulated in the junction capacitance portion. On the other hand, when the m-th row selecting control signal Vsel(m) is at high level, the readout switch $SW_1$ closes, and charges generated in the photodiode PD and accumulated in the junction capacitance portion until then are output to the n-th column readout wiring $L_{O,n}$ through the readout switch $SW_1$.

The n-th column readout wiring $L_{O,n}$ is connected to the readout switches $SW_1$ included in M pixel portions $P_{1,n}$ to $P_{M,n}$ of the n-th column in the photodetecting section 10. The n-th column readout wiring $L_{O,n}$ reads out charges generated in the photodiode PD included in any of the M pixel portions $P_{1,n}$ to $P_{M,n}$ via the readout switch $SW_1$ included in the pixel portion, and transfers the charges to the integration circuit $S_n$.

The integration circuit $S_n$ includes an amplifier $A_2$, an integrating capacitive element $C_2$, and a discharge switch $SW_2$. The integrating capacitive element $C_2$ and the discharge switch $SW_2$ are connected in parallel to each other, and provided between an input terminal and an output terminal of the amplifier $A_2$. The input terminal of the amplifier $A_2$ is connected to the n-th column readout wiring $L_{O,n}$. The discharge switch $SW_2$ is supplied with a discharging control signal Reset which passed through the discharge wiring $L_R$ from the controlling section 30. The discharging control signal Reset instructs opening and closing operations of the discharge switches $SW_2$ included in N integration circuits $S_1$ to $S_N$.

In this integration circuit $S_n$, when the discharging control signal Reset is at high level, the discharge switch $SW_2$ closes and the integrating capacitive element $C_2$ is discharged, and a voltage value to be output from the integration circuit $S_n$ is initialized. When the discharging control signal Reset is at low level, the discharge switch $SW_2$ opens, and charges input in the input terminal are accumulated in the integrating capacitive element $C_2$, and a voltage value corresponding to the accumulated charge amount is output from the integration circuit $S_n$.

The holding circuit $H_n$ includes an input switch $SW_{31}$, an output switch $SW_{32}$, and a holding capacitive element $C_3$. One end of the holding capacitive element $C_3$ is grounded. The other end of the holding capacitive element $C_3$ is connected to the output terminal of the integration circuit $S_n$ via the input switch $SW_{31}$, and connected to the voltage output wiring $L_{out}$ via the output switch $SW_{32}$. The input switch $SW_{31}$ is supplied with a holding control signal Hold which passed through the holding wiring $L_H$ from the controlling section 30. The holding control signal Hold instructs opening and closing operations of input switches $SW_{31}$ included in the N holding circuits $H_1$ to $H_N$. The output switch S32 is supplied with an n-th column selecting control signal Hsel(n) which passed through the n-th column selection wiring $L_{H,n}$ from the controlling section 30. The n-th column selecting control signal Hsel(n) instructs opening and closing operations of the output switch $SW_{32}$ included in the holding circuit $H_n$.

In this holding circuit $H_n$, when the holding control signal Hold switches from high level to low level, the input switch $SW_{31}$ switches from a closed state to an open state, and a voltage value input in the input terminal at this time is held by the holding capacitive element $C_3$. When the n-th column selecting control signal Hsel(n) is at high level, the output switch $SW_{32}$ closes and the voltage value held by the holding capacitive element $C_3$ is output to the voltage output wiring $L_{out}$.

When outputting voltage values corresponding to received light intensities received by the N pixel portions $P_{m,1}$ to $P_{m,N}$ of the m-th row in the photodetecting section 10, the controlling section 30 instructs temporary closing and then opening of discharge switches $SW_2$ included in the N integration circuits $S_1$ to $S_N$ by the discharging control signal Reset, and then instructs closing of the readout switches $SW_1$ included in the N pixel portions $P_{m,1}$ to $P_{m,N}$ of the m-th row in the photodetecting section 10 for a predetermined period by an m-th row selecting control signal Vsel(m). The controlling section 30 instructs switching of the input switches $SW_{31}$ included in the N holding circuits $H_1$ to $H_N$ from a closed state to an open state by a holding control signal Hold in the predetermined period. Then, after the predetermined period, the controlling section 30 instructs successive closing of the output switches $SW_{32}$ included in the N holding circuits $H_1$ to $H_N$ for a predetermined period by column selecting control signals Hsel(1) to Hsel(N). The controlling section 30 performs the above-described control for the rows in order.

Next, operations of the solid state imaging device 1 of the present embodiment will be described. In the solid state imaging device 1 of the present embodiment, under control by the controlling section 30, according to level changes of the M row selecting control signals Vsel(1) to Vsel(M), the N column selecting control signals Hsel(1) to Hsel(N), the discharging control signal Reset, and the holding control signal Hold at predetermined timings, light made incident on the photodetecting section 10 can be imaged and frame data can be obtained, and the frame data can be corrected by the correction processing section 40.

Figure 3:
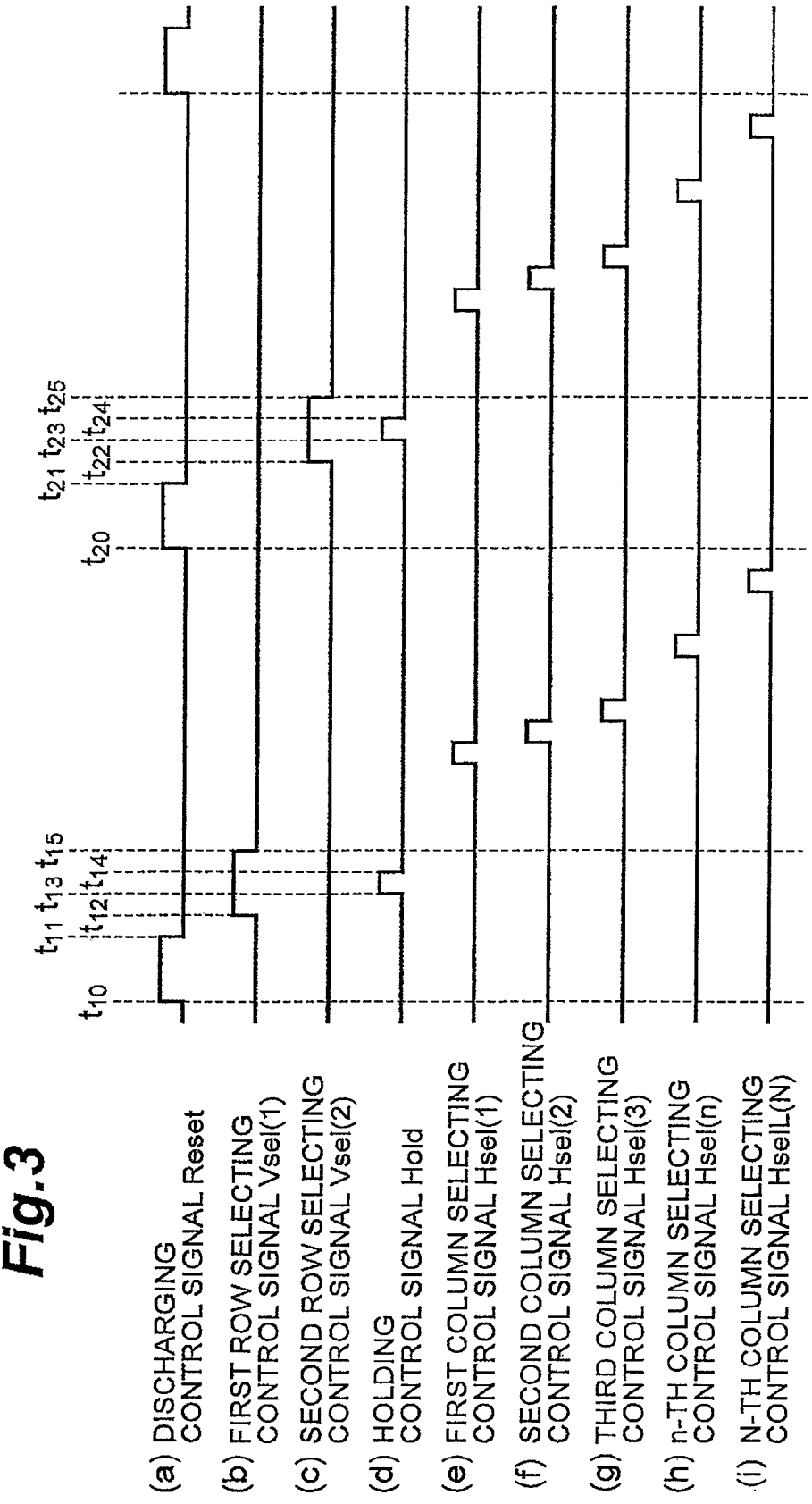
FIG. 3 is a timing chart describing operations of the solid state imaging device 1 of the present embodiment.

FIG. 3 is a timing chart describing operations of the solid state imaging device 1 of the present embodiment. This figure shows, in order from the top, (a) the discharging control signal Reset for instructing opening and closing operations of the discharge switches $SW_2$ included in N integration circuits $S_1$ to $S_N$, (b) the first row selecting control signal Vsel(1) for instructing opening and closing operations of the readout switches $SW_1$ included in the N pixel portions $P_{1,1}$ to $P_{1,N}$ of the first row in the photodetecting section 10, (c) the second row selecting control signal Vsel(2) for instructing opening and closing operations of the readout switches $SW_1$ included in the N pixel portions $P_{2,1}$ to $P_{2,N}$ of the second row in the photodetecting section 10, and (d) the holding control signal Hold for instructing opening and closing operations of the input switches $SW_{31}$ included in the N holding circuits $H_1$ to $H_N$.

This figure further shows, subsequently in order, (e) the first column selecting control signal Hsel(1) for instructing opening and closing operations of the output switch $SW_{32}$ included in the holding circuit $H_1$, (f) the second column selecting control signal Hsel(2) for instructing opening and closing operations of the output switch $SW_{32}$ included in the holding circuit $H_2$, (g) the third column selecting control signal Hsel(3) for instructing opening and closing operations of the output switch $SW_{32}$ included in the holding circuit $H_3$, (h) the n-th column selecting control signal Hsel(n) for instructing opening and closing operations of the output switch $SW_{32}$ included in the holding circuit $H_n$, and (i) the N-th column selecting control signal Hsel(N) for instructing opening and closing operations of the output switch $SW_{32}$ included in the holding circuit $H_N$.

Charges generated in the photodiodes PD included in the N pixel portions $P_{1,1}$ to $P_{1,N}$ of the first row and accumulated in the junction capacitance portions are read out as follows. Before the time $t_{10}$, the M row selecting control signals Vsel(1) to Vsel(M), N column selecting control signals Hsel(1) to Hsel(N), the discharging control signal Reset, and the holding control signal Hold are at low level.

During the period from the time $t_{10}$, to the time $t_{11}$, the discharging control signal Reset to be output from the controlling section 30 to the discharge wiring $L_R$ becomes high level, and accordingly, in the N integration circuits $S_1$ to $S_N$, the discharge switches $SW_2$ close and the integrating capacitive elements $C_2$ are discharged. During the period from the time $t_{12}$ after the time $t_{11}$ to the time $t_{15}$, the first row selecting control signal Vsel(1) to be output from the controlling section 30 to the first row selection wiring $L_{V,1}$ becomes high level, and accordingly, the readout switches $SW_1$ included in the N pixel portions $P_{1,1}$ to $P_{1,N}$ of the first row in the photodetecting section 10 close.

In this period ($t_{12}$ to $t_{15}$), during the period from the time $t_{13}$ to the time $t_{14}$, the holding control signal Hold to be output from the controlling section 30 to the holding wiring $L_H$ becomes high level, and accordingly, input switches $SW_{31}$ in the N holding circuits $H_1$ to $H_N$ close.

In the period ($t_{12}$ to $t_{15}$), the readout switch $SW_1$ included in each pixel portion $P_{1,n}$ of the first row is closed and the discharge switch $SW_2$ of each integration circuit $S_n$ is open, so that charges generated in the photodiode PD of each pixel portion $P_{1,n}$ and accumulated in the junction capacitance portion until then are transferred to and accumulated in the integrating capacitive element $C_2$ of the integration circuit $S_n$ through the readout switch $SW_1$ of the pixel portion $P_{1,n}$ and the n-th column readout wiring $L_{O,n}$. Then, a voltage value corresponding to the amount of charges accumulated in the integrating capacitive element $C_2$ of each integration circuit $S_n$ is output from the output terminal of the integration circuit $S_n$.

At the time $t_{14}$ in the period ($t_{12}$ to $t_{15}$), the holding control signal Hold switches from high level to low level, and accordingly, in each of the N holding circuits $H_1$ to $H_N$, the input switch $SW_{31}$ switches from a closed state to an open state, and the voltage value output from the output terminal of the integration circuit $S_n$ and input in the input terminal of the holding circuit $H_n$ is held by the holding capacitive element $C_3$.

Then, after the period ($t_{12}$ to $t_{15}$), the column selecting control signals Hsel(1) to Hsel(N) to be output from the controlling section 30 to the column selection wirings $L_{H,1}$ to $L_{H,N}$ successively become high level for a predetermined period, and accordingly, the output switches $SW_{32}$ included in the N holding circuits $H_1$ to $H_N$ successively close for the predetermined period, and voltage values held by the holding capacitive elements C3 of the respective holding circuits $H_n$ are successively output to the voltage output wiring $L_{out}$ through the output switches $SW_{32}$. These voltage values $T_{out}$ to be output to the voltage output wiring $L_{out}$ indicate the received light intensities received by the photodiodes PD included in the N pixel portions $P_{1,1}$ to $P_{1,N}$ of the first row. The voltage values $V_{out}$ output from the N holding circuits $H_1$ to $H_N$ to the voltage output wiring $L_{out}$ are input into the correction processing section 40 through the voltage output wiring $L_{out}$.

Subsequently, charges generated in the photodiodes PD included in the N pixel portions $P_{2,1}$ to $P_{2,N}$ of the second row and accumulated in the junction capacitance portions are read out as follows.

During the period from the time $t_{20}$ to the time $t_{21}$, the discharging control signal Reset to be output from the controlling section 30 to the discharge wiring $L_R$ becomes high level, and accordingly, in the N integration circuits $S_1$ to $S_N$, the discharge switches $SW_2$ close and the integrating capacitive elements $C_2$ are discharged. During the period from the time $t_{22}$ after the time $t_{21}$ to the time $t_{25}$, the second row selecting control signal Vsel(2) to be output from the controlling section 30 to the second row selection wiring $L_{V,2}$ becomes high level, and accordingly, the readout switches $SW_1$ included in the N pixel portions $P_{2,1}$ to $P_{2,N}$ of the second row in the photodetecting section 10 close.

In this period ($t_{22}$ to $t_{25}$), during the period from the time $t_{23}$ to the time $t_{24}$, the holding control signal Hold to be output from the controlling section 30 to the holding wiring $L_H$ becomes high level, and accordingly, in the N holding circuits $H_1$ to $H_N$, the input switches $SW_{31}$ close.

Then, after the period ($t_{22}$ to $t_{25}$), the column selecting control signals Hsel(1) to Hsel(N) to be output from the controlling section 30 to the column selection wirings $L_{H,1}$ to $L_{H,N}$ successively become high level for a predetermined period, and accordingly, the output switches $SW_{32}$ included in the N holding circuits $H_1$ to $H_N$ successively close for the predetermined period.

Thus, voltage values $V_{out}$ indicating received light intensities received by the photodiodes PD included in the N pixel portions $P_{2,1}$ to $P_{2,N}$ of the second row are output to the voltage output wiring $L_{out}$. The voltage values $V_{out}$ output from the N holding circuits $H_1$ to $H_N$ to the voltage output wiring $L_{out}$ are input into the correction processing section 40 through the voltage output wiring $L_{out}$.

Continuously from the operations for the first row and the second row described above, the same operations are performed for the third to M-th rows, and frame data indicating an image which is obtained by one imaging is obtained. When the operations for the M-th row are finished, the same operations are performed again in order from the first row, and frame data indicating a next image is obtained. By thus repeating the same operations with a predetermined period, voltage values $V_{out}$ indicating two-dimensional intensity distribution of the image of light received by the photodetecting section 10 are output to the voltage output wiring $L_{out}$, and frame data are repeatedly obtained. These frame data are input into the correction processing section 40.

Charges generated in the photodiode PD of each pixel portion $P_{m,n}$ of the m-th row and accumulated in the junction capacitance portion during the period of closing of the readout switches $SW_1$ included in the N pixel portions $P_{m,1}$ to $P_{m,N}$ of the m-th row are transferred to the integrating capacitive element $C_2$ of the integration circuit $S_n$ through the readout switch $SW_1$ of the pixel portion $P_{m,n}$ and the n-th column readout wiring $L_{O,n}$. At this time, the accumulated charges in the junction capacitance portion of the photodiode PD of each pixel portion $P_{m,n}$ of the m-th row are initialized.

However, when a certain n-th column readout wiring $L_{O,n}$ is broken at a point halfway, pixel portions farther from the integration circuit $S_n$ than the broken point among the M pixel portions $P_{1,n}$ to $P_{M,n}$ of the n-th column are not connected to the integration circuit $S_n$, and cannot transfer charges to the integration circuit $S_n$, so that initialization of the accumulated charges in the junction capacitance portions of the photodiodes PD by this charge transfer is impossible. If this goes on, charges generated in the photodiodes in response to light incidence on these pixel portions are just accumulated in the junction capacitance portions of the photodiodes, and if the accumulated charges exceed a saturation level, the charges overflow to pixel portions in neighboring columns on both sides, and defective lines occur with pixel portions in three consecutive columns.

Therefore, in the solid state imaging device 1 of the present embodiment, the correction processing section 40 acquires respective frame data repeatedly output from the signal readout section 20 and applies the following correction processing to the frame data.

Hereinafter, it is assumed that any readout wiring $L_{O,n1}$ of the n1-th column among the readout wirings $L_{O,1}$ to $L_{O,N}$ is broken. Then, a pixel portion on a defective line which is not connected to the signal readout section 20 due to the breakage of the readout wiring $L_{O,n1}$ among the M pixel portions $P_{1,n1}$ to $P_{M,n1}$ of the n1-th column is defined as a pixel portion $P_{m1,n1}$. A pixel portion on a neighboring line neighboring the pixel portion $P_{m1,n1}$ in the n2-th column neighboring the n1-th column is defined as a pixel portion $P_{m1,n2}$. Here, m1 is an integer not less than 1 and not more than M, n1 and n2 are integers not less than 1 and not more than N, and a difference between n1 and n2 is 1.

Frame data output k-th from the signal readout section 20 is denoted as $F_k$. That is, frame data output from the signal readout section 20 and input into the correction processing section 40 are . . . $F_{k-2}$, $F_{k-1}$, $F_k$, $F_{k+1}$, $F_{k+2}$, . . . , and k is an integer.

The correction processing section 40 corrects a voltage value $V_k$ corresponding to a pixel portion $P_{m1,n2}$ on the neighboring line in the frame data $F_k$ based on voltage values $V_k$, $V_{k-1}$, and $V_{k-2}$ corresponding to the same pixel portion $P_{m1,n2}$ in the frame data $F_k$ and at least two frame data $F_{k-1}$ and $F_{k-2}$ just before the frame data $F_k$.

At this time, as processing to correct the voltage value $V_k$ corresponding to the pixel portion $P_{m1,n2}$ on the neighboring line in the frame data $F_k$, the correction processing section 40 may use a function such as a polynomial with the voltage values $V_k$, $V_{k-1}$, and $V_{k-2}$ as variables, however, preferably, the correction processing section 40 performs processing of subtracting values obtained by multiplying the voltage values $V_k$, $V_{k-1}$, and $V_{k-2}$ by coefficients from the voltage value $V_k$.

It is also preferable that, when any plurality of readout wirings among the readout wirings $L_{O,1}$ to $L_{O,N}$ are broken, the correction processing section 40 sets the coefficients for each of the plurality of broken readout wirings, and corrects the voltage value $V_k$ corresponding to the pixel portion $P_{m1,n2}$ in the frame data $F_k$.

Further, the correction processing section 40 determines a voltage value corresponding to the pixel portion $P_{m1,n2}$ on the defective line in the frame data $F_k$ based on a value after being corrected of the voltage value corresponding to the pixel portion $P_{m1,n2}$ on the neighboring line. This determination is preferably made by interpolation calculation based on voltage values corresponding to pixel portions $P_{m1,n2}$ on neighboring lines on both sides.

Then, the correction processing section 40 outputs frame data after being corrected as described above of the voltage values corresponding to the pixel portions $P_{m1,n2}$ on the neighboring lines and the pixel portion $P_{m1,n1}$ on the defective line.

Correction processing to be applied to the voltage value $V_k$ corresponding to the pixel portion $P_{m1,n2}$ on the neighboring line is described in greater detail as follows.

Figure 4:
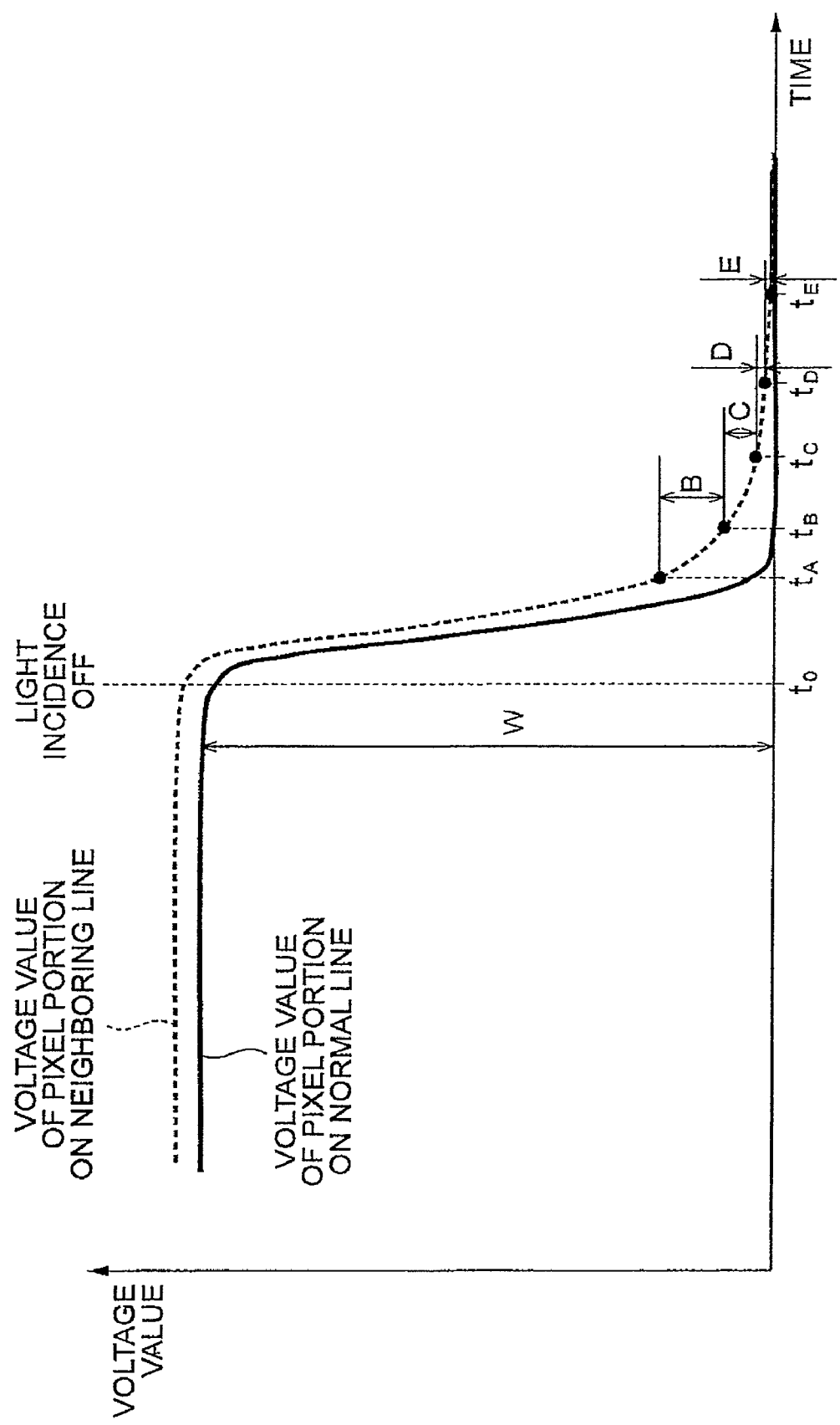
FIG. 4 is a diagram schematically showing temporal changes of voltage values corresponding to pixel portions of a normal line and a neighboring line of frame data output from the signal readout section 20.

FIG. 4 is a diagram schematically showing temporal changes of the voltage values corresponding to pixel portions on a normal line and a neighboring line in frame data output from the signal readout section 20. Here, it is assumed that light with uniform intensity is made incident on the entire photodetecting section 10 before the time $t_0$. It is also assumed that no light is made incident on the entire photodetecting section 10 after the time $t_0$. The normal line is neither a defective line the readout wiring of which is broken, nor a neighboring line into which charges flow from a pixel portion on the defective line.

As shown in this figure, when light with uniform intensity is made incident on the entire photodetecting section 10 before the time $t_0$, in the frame data output from the signal readout section 20, a voltage value corresponding to a pixel portion on the neighboring line is larger than a voltage value W corresponding to a pixel portion on the normal line. The reason for this is because charges generated in the pixel portion on the defective line in response to light incidence are not read out to the signal readout section 20 but are just accumulated in the junction capacitance portion of the photodiode, and if the accumulated charge amount exceeds a saturation level, the charges over the saturation level overflow to the pixel portion on the neighboring line.

When no light is made incident on the entire photodetecting section 10 after the time $t_0$, both voltage values corresponding to the pixel portions on a normal line and a neighboring line in the frame data output from the signal readout section 20 gradually decrease, and converge to an initial value (a value indicating that no light is made incident) soon. However, in comparison with the change in the voltage value corresponding to the pixel portion on the normal line, the change in the voltage value corresponding to the pixel portion on the neighboring line has a time delay, and also has a slower decrease speed. The possible reason for this is because the leak of the charges from the pixel portion on the defective line to the pixel portion on the neighboring line takes time.

Based on the knowledge of the inventor of the present invention about the above-described phenomenon, the correction processing section 40 corrects the voltage value $V_k$ corresponding to the pixel portion $P_{m1,n2}$ on the neighboring line in the frame data $F_k$ output from the signal readout section 20 based on voltage values $V_k$, $V_{k-1}$, and $V_{k-2}$ corresponding to the same pixel portion $P_{m1,n2}$ in the frame data $F_k$ and at least two frame data $F_{k-1}$ and $F_{k-2}$ just before the frame data $F_k$.

As shown in FIG. 4, it is assumed that a voltage value corresponding to a pixel portion on the neighboring line in the frame data output from the signal readout section 20 has an amount of change B in the period from the time $t_A$ after the time $t_0$ to the time $t_B$, an amount of change C in the period from the time $t_B$ to the time $t_C$, an amount of change D in the period from the time $t_C$ to the time $t_D$, and an amount of change E from the time $t_D$ to the time $t_E$.

As shown in the following Numerical formula (1), coefficients b, c, d, and e are obtained by dividing these amounts of changes B, C, D, and E by a voltage value W corresponding to a pixel portion on the normal line in frame data output from the signal readout section 20 when light with uniform intensity is made incident in the photodetecting section 10 before the time $t_0$.

Numerical formula (1)

$$b = B/W \quad (1a)$$

$$c = C/W \quad (1b)$$

$$d = D/W \quad (1c)$$

$$e = E/W \quad (1d)$$

Figure 5:
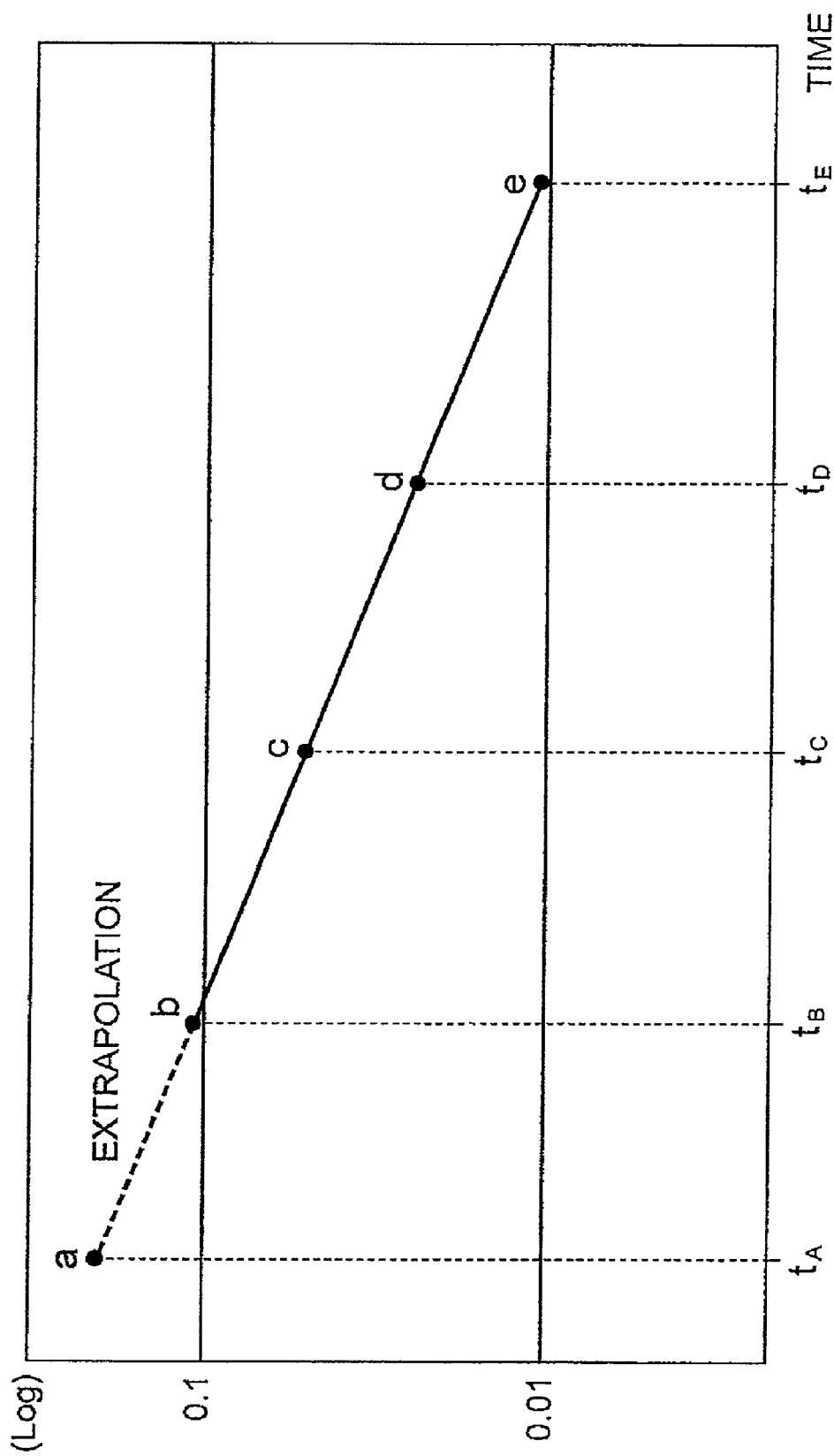
FIG. 5 is a diagram showing the relationship between change in a voltage value corresponding to a pixel portion on the neighboring line in the frame data output from the signal readout section 20, and time.

FIG. 5 is a diagram showing the relationship between an amount of change in the voltage value corresponding to a pixel portion on the neighboring line in the frame data output from the signal readout section 20, and time. As shown in this figure, the relationship between logarithmic values of the coefficients b, c, d, and e and the corresponding times $t_B$, $t_C$, $t_D$, and $t_E$ is linear. By using this, the coefficient a at the time $t_A$ is obtained by extrapolation.

Specifically, according to the relational expressions shown in the following Numerical formula (2), the coefficients a to e are converted into coefficients $a_1$ to $e_1$. That is, the coefficients $a_1$ to $e_1$ are obtained by multiplying the coefficients a to e by a fixed coefficient, and a sum of them becomes 1.

Numerical formula (2)

$$a_1 = a/(a+b+c+d+e) \quad (2a)$$

$$b_1 = b/(a+b+c+d+e) \quad (2b)$$

$$c_1 = c/(a+b+c+d+e) \quad (2c)$$

$$d_1 = d/(a+b+c+d+e) \quad (2d)$$

$$e_1 = e/(a+b+c+d+e) \quad (2e)$$

It is assumed that the intervals between the times $t_0$ and $t_A$ to $t_E$ are equal to periods of frame data output from the signal readout section 20. In this case, examples of the values of the coefficients $a_1$ to $e_1$ become as shown in the following Numerical formula (3).

Numerical formula (3)

$$a_1 = 0.5354 \quad (3a)$$

$$b_1 = 0.2647 \quad (3b)$$

$$c_1 = 0.1177 \quad (3c)$$

$$d_1 = 0.05633 \quad (3d)$$

$$e_1 = 0.02587 \quad (3e)$$

Further, the coefficients $a_1$ to $e_1$ are converted into coefficients $a_2$ to $e_2$ according to the relational expressions shown in the following Numerical formula (4). $V_{ave1}$ in the expression (4f) is an average of voltage values corresponding to a pixel portion on a neighboring line in frame data output from the signal readout section 20 when light with uniform intensity is made incident on the entire photodetecting section 10 before the time $t_0$. $V_{ave2}$ is an average of voltage values corresponding to a pixel portion on a normal line in the frame data. That is, the parameter z in the expression (4f) indicates a rate of increase of the average $V_{ave1}$ of the voltage values corresponding to the pixel portions on the neighboring line with respect to the average $V_{ave2}$ of the voltage values corresponding to pixel portions on the normal line.

Numerical formula (4)

$$a_2 = a_1 z \quad (4a)$$

$$b_2 = b_1 z \quad (4b)$$

$$c_2 = c_1 z \quad (4c)$$

$$d_2 = d_1 z \quad (4d)$$

$$e_2 = e_1 z \quad (4e)$$

$$z = V_{ave1}/V_{ave2} - 1 \quad (4f)$$

Then, according to the relational expression shown in the following Numerical formula (5), the voltage value $V_k$ corresponding to the pixel portion $P_{m1,n2}$ on the neighboring line in the frame data $F_k$ is corrected based on the voltage values $V_k$ to $V_{k-4}$ corresponding to the same pixel portion $P_{m1,n2}$ in the frame data $F_k$ and four frame data $F_{k-1}$ to $F_{k-4}$ just before the frame data $F_k$. Specifically, values obtained by multiplying the voltage values $V_k$ to $V_{k-4}$ by the coefficients $a_2$ to $e_2$ are subtracted from the voltage value $V_k$. Thus, the voltage value $V_{kc}$ after being corrected of the voltage value $V_k$ is obtained.

Numerical formula (5)

$$V_{kc} = V_k - a_2 V_k - b_2 V_{k-1} - c_2 V_{k-2} - d_2 V_{k-3} - e_2 V_{k-4} \quad (5)$$

The correction processing section 40 obtains the voltage value $V_{kc}$ after being corrected of the voltage value $V_k$ corresponding to the pixel portion $P_{m1,n2}$ on the neighboring line as described above in the frame data $F_k$ output from the signal readout section 20, and then determines a voltage value corresponding to the pixel portion $P_{m1,n1}$ on the defective line based on the corrected voltage value $V_{kc}$.

The correction processing section 40 preferably applies dark calibration in advance to the voltage values corresponding to pixel portions in the frame data $F_k$ output from the signal readout section 20 before the above-described processing. The correction processing section 40 may use analog processing to perform the above-described processing, however, preferably, the correction processing section 40 performs digital processing after digital-converting the frame data $F_k$ output from the signal readout section 20, and preferably has frame memories which store frame data of several frames as digital values.

Preferably, to perform the above-described processing, the correction processing section 40 includes a storage section which stores data on a broken readout wiring among the readout wirings $L_{O,1}$ to $L_{O,N}$ and a broken point of the broken readout wiring in advance. Further, preferably, wire breakage information obtained in inspection in the middle or after production of the solid state imaging device 1 is stored in the storage section from the outside.

The correction processing section 40 may be provided integrally with the photodetecting section 10, the signal readout section 20, and the controlling section 30. In this case, preferably, the entire solid state imaging device 1 is integrated on a semiconductor substrate. The photodetecting section 10, the signal readout section 20, and the controlling section 30 are integrated, however, the correction processing section 40 may be provided separately. In this case, the correction processing section 40 can be realized by, for example, a computer.

As described above, in the solid state imaging device 1 of the present embodiment or the method for correcting frame data $F_k$ output from the signal readout section 20 of the solid state imaging device 1, the voltage value $V_k$ corresponding to the pixel portion $P_{m1,n2}$ on the neighboring line in the frame data $F_k$ is corrected based on the voltage values $V_k$ to $V_{k-4}$ corresponding to the same pixel portion $P_{m1,n2}$ in the frame data $F_k$ and four frame data $F_{k-1}$ to $F_{k-4}$ just before the frame data $F_k$. In other words, when correcting the voltage value $V_k$ corresponding to the pixel portion $P_{m1,n2}$ on the neighboring line, it is not necessary to use a voltage value corresponding to a pixel portion on the normal line. Therefore, in the present embodiment, the resolution near the defective line in the image after being corrected becomes higher than in the invention described in Patent Document 1.

In the embodiment described above, when correcting the voltage value $V_k$ corresponding to the pixel portion $P_{m1,n2}$ on the neighboring line in the frame data $F_k$, the voltage values $V_k$ to $V_{k-4}$ corresponding to the same pixel portion $P_{m1,n2}$ in the frame data $F_k$ and the four frame data $F_{k-1}$ to $F_{k-4}$ just before the frame data $F_k$ are used. However, as is understood from Numerical formulas (3) and (4) given above, the values of the coefficients $a_2$, $b_2$, $c_2$, $d_2$, and $e_2$ decrease substantially by half in order. Therefore, to obtain resolution higher than in the invention described in Patent Document 1, the correction is made based on the voltage values $V_k$, $V_{k-1}$, and $V_{K-2}$ corresponding to the same pixel portion $P_{m1,n2}$ in the frame data $F_k$ to be corrected and at least two frame data $F_{k-1}$ and $F_{k-2}$ just before the frame data $F_k$ in the present embodiment.

The frame data output operation by the signal readout section 20 and the correction processing by the correction processing section 40 may be performed alternately, or performed in parallel. In the former case, after an operation for outputting the frame data $F_k$ by the signal readout section 20, correction processing for the frame data $F_k$ by the correction processing section 40 is performed, and after the correction processing is finished, the next frame data $F_{k+1}$ is output from the signal readout section 20 to the correction processing section 40. On the other hand, in the latter case, after the operation for outputting the frame data $F_k$ by the signal readout section 20, the correction processing for the frame data $F_k$ by the correction processing section 40 is performed, and in a period at least a part of which overlaps the period of the correction processing, the next frame data $F_{k+1}$ is output from the signal readout section 20 to the correction processing section 40.

The leakage of charges from a pixel portion on a defective line to a pixel portion on a neighboring line occurs so that the charges leak to pixel portions on neighboring lines on both sides of the defective line. Therefore, preferably, the pixel portions on neighboring lines on both sides of the defective line are corrected by using voltage values of previous frame data. However, in a case where a voltage value of a pixel portion on a neighboring line on one side of the defective line and a voltage value of a pixel portion on a normal line further neighboring the neighboring line on the same side are binned (summed) and read out, the correction using the voltage values of the previous frame data is applied only to the voltage value of the pixel portion on the neighboring line on the other side of the defective line. Even in this case, resolution higher than in the invention described in Patent Document 1 is obtained.

Figure 6:
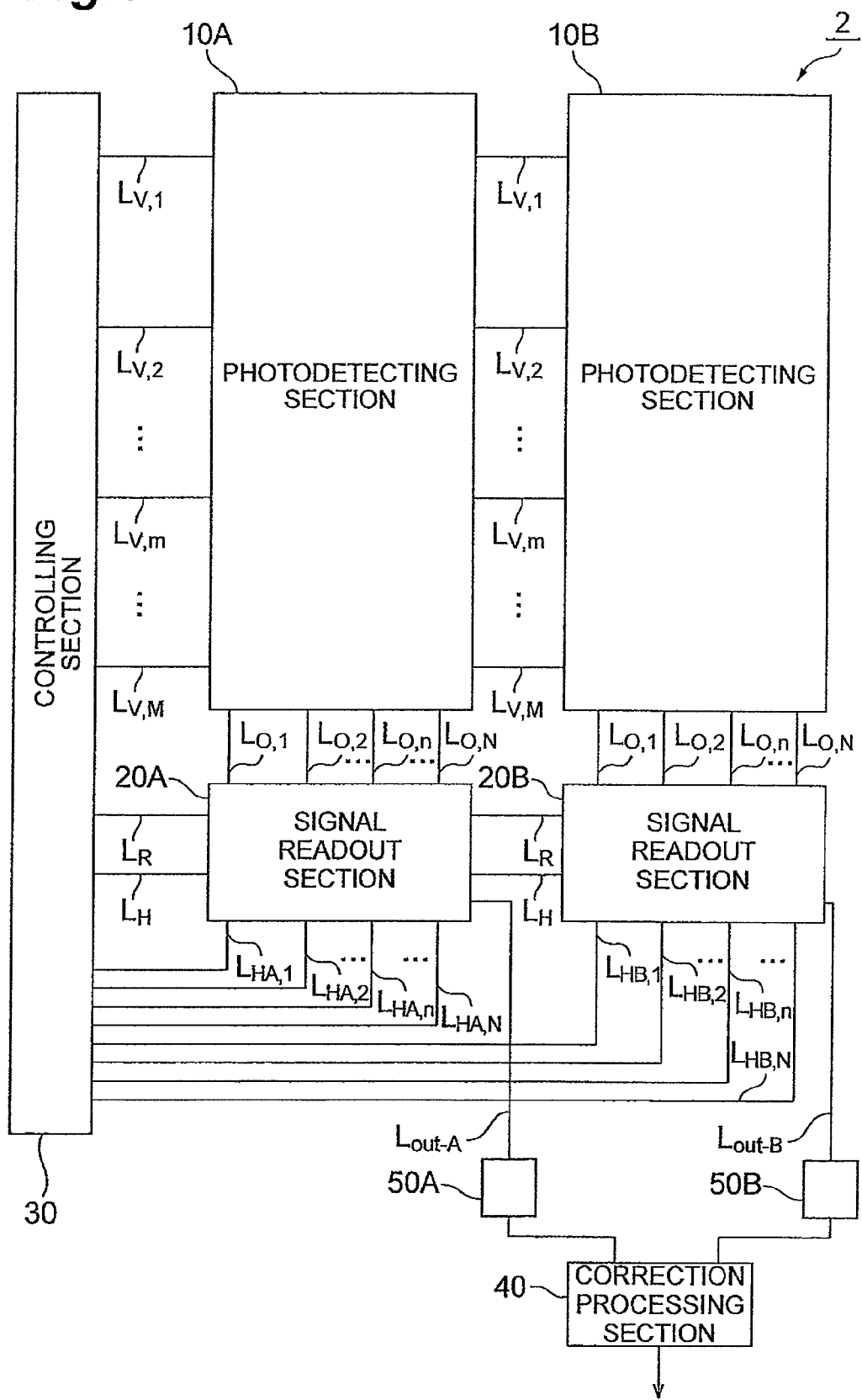
FIG. 6 is a configuration view of a solid state imaging device 2 of another embodiment.

Next, another embodiment of the solid state imaging device of the present invention will be described. FIG. 6 is a configuration view of a solid state imaging device 2 of another embodiment. This solid state imaging device 2 includes photodetecting sections 10A and 10B, signal readout sections 20A and 20B, a controlling section 30, a correction processing section 40, and buffer sections 50A and 50B. When it is used as an X-ray flat panel, a scintillator panel is overlaid on the photodetecting sections 10A and 10B of the solid state imaging device 2.

The photodetecting sections 10A and 10B included in the solid state imaging device 2 are similar to the photodetecting section 10 included in the solid state imaging device 1. The signal readout sections 20A and 20B included in the solid state imaging device 1 are similar to the signal readout section 20 included in the solid state imaging device 1.

The controlling section 30 included in the solid state imaging device 2 outputs an m-th row selecting control signal Vsel(m) to the m-th row selection wiring $L_{V,m}$ to supply this m-th row selecting control signal Vsel(m) to the pixel portions $P_{m,1}$ to $P_{m,N}$ of the m-th rows included in the photodetecting sections 10A and 10B. The controlling section 30 outputs an n-th column selecting control signal Hsel(n) which should be supplied to each holding circuit $H_n$ included in the signal readout section 20A to the n-th column selection wiring $L_{HA,n}$, and outputs an n-th column selecting control signal Hsel(n) which should be supplied to each holding circuit $H_n$ included in the signal readout section 20B to the n-th column selection wiring $L_{HB,n}$.

The controlling section 30 outputs a discharging control signal Reset which should be supplied to the respective integration circuits $S_n$ included in the signal readout sections 20A and 20B to the discharge wiring $L_R$. The controlling section 30 outputs a holding control signal Hold which should be supplied to the respective holding circuits $H_n$ included in the signal readout sections 20A and 20B to the holding wiring $L_H$.

As described above, the controlling section 30 controls opening and closing operations of the readout switches $SW_1$ included in N pixel portions $P_{m,1}$ to $P_{m,N}$ of the m-th rows included in the photodetecting sections 10A and 10B, and controls voltage value holding operations and output operations in the signal readout sections 20A and 20B. Accordingly, the controlling section 30 makes the signal readout sections 20A and 20B repeatedly output voltage values corresponding to amounts of charges generated in the photodiodes PD included in M×N pixel portions $P_{1,1}$ to $P_{M,N}$ in the photodetecting sections 10A and 10B as frame data.

Thus, the solid state imaging device 2 includes a plurality of pairs of photodetecting sections and signal readout sections, and accordingly, the solid state imaging device 2 can expand the light receiving region, or increase the number of pixels. The plurality of signal readout sections can be operated in parallel to each other, and high-speed reading out of pixel data is possible.

The correction processing section 40 inputs voltage values which were successively output from the holding circuits $H_n$ included in the signal readout section 20A to the voltage output wiring $L_{out\_A}$ and passed through the buffer section 50A, and inputs voltage values which were successively output from the holding circuits $H_n$ included in the signal readout section 20B to the voltage output wiring $L_{out\_B}$ and passed through the buffer section 50B. Then, the correction processing section 40 acquires frame data repeatedly output from the signal readout sections 20A and 20B and applies correction processing thereto, and outputs frame data after being subjected to the correction processing.

The details of processing in this correction processing section 40 are as described above. However, the operation characteristics of the buffer section 50A and the buffer section 50B are not always equal to each other, and even when their input voltage values are the same, their output voltage values are different in some cases. Therefore, when a readout wiring of any of the columns included in the photodetecting section 20A is broken, the correction processing section 40 preferably obtain the coefficients $a_2$ to $e_2$ based on voltage values of a neighboring line and a normal line in frame data corresponding to the photodetecting section 20A. Similarly, when a readout wiring of any of the columns included in the photodetecting section 20B is broken, the correction processing section 40 preferably obtains the coefficients $a_2$ to $e_2$ based on voltage values of a neighboring line and a normal line in frame data corresponding to the photodetecting section 20B.

The solid state imaging device 1 of the present embodiment or the method for correcting frame data output from the signal readout section 20 of the solid state imaging device 1 is preferably used in an X-ray CT device. An embodiment of an X-ray CT device including the solid state imaging device 1 of the present embodiment will be described next.

Figure 7:
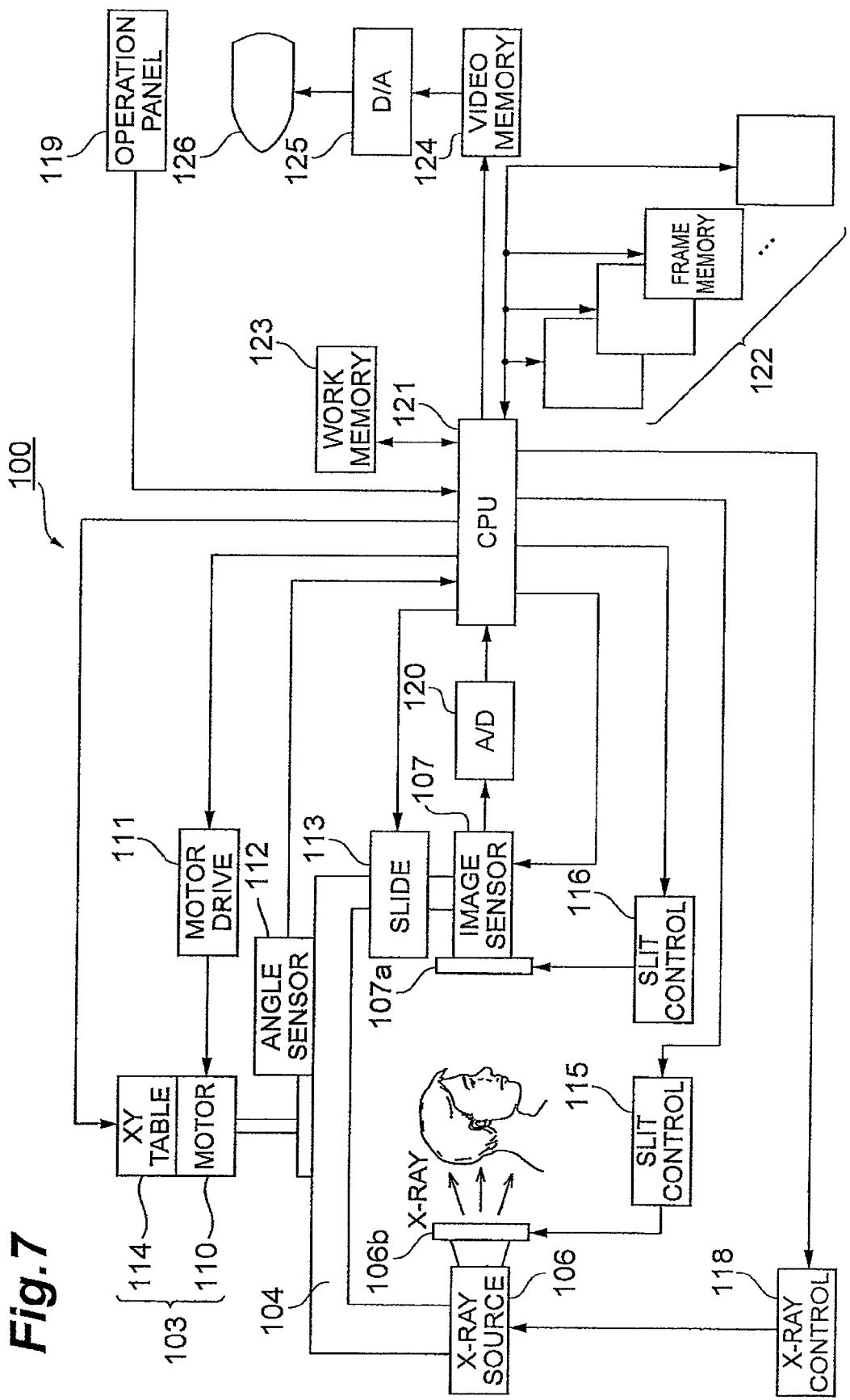
FIG. 7 is a configuration view of an X-ray CT device 100 of the present embodiment.

FIG. 7 is a configuration view of an X-ray CT device 100 of the present embodiment. In the X-ray CT device 100 shown in this figure, an X-ray source (X-ray output section) 106 generates X-rays toward a subject. The irradiation field of the X-rays generated from the X-ray source 106 is controlled by a primary slit plate 106b. The X-ray source 106 includes an X-ray tube installed inside, and by adjusting the conditions such as a tube voltage, a tube current, and an energization time of the X-ray tube, the X-ray irradiation amount onto the subject is controlled. An X-ray imager 107 includes a CMOS solid state imaging device having a plurality of pixel portions two-dimensionally arrayed, and detects an X-ray image which passed through the subject. In front of the X-ray imager 107, a secondary slit plate 107a which limits an X-ray incidence region is provided.

A swiveling arm 104 holds the X-ray source 106 and the X-ray imager 107 opposite to each other and swivels these around a subject when performing panoramic tomography. A slide mechanism 113 for linearly displacing the X-ray imager 107 with respect to a subject when performing linear tomography is provided. The swiveling arm 104 is driven by an arm motor 110 constituting a rotary table, and the rotation angle is detected by an angle sensor 112. The arm motor 110 is loaded on a movable portion of an XY table 114, and by moving the XY table 114 within a horizontal plane, the rotation center is arbitrarily adjusted within the horizontal plane. The arm motor 110 and the XY table constitute a rotary drive unit 103. Thus, the solid state imaging device 1 or 2 installed inside the X-ray source 106 and the X-ray imager 107 are moved relative to a subject by various moving means 104, 110, 114, and 113.

An image signal output from the X-ray imager 107 is converted into digital data of, for example, 10 bits (=1024 level) by an AD converter 120, and temporarily taken into a CPU (Central Processing Unit) 121, and then stored in a frame memory 122. From the image data stored in the frame memory 122, a tomographic image along an arbitrary tomographic surface is reproduced by predetermined arithmetic processing. The reproduced tomographic image is output to a video memory 124, converted into an analog signal by a DA converter 125, and then displayed by an image display section 126 such as a CRT (Cathode-Ray Tube) and used for various diagnoses.

To the CPU 121, a work memory 123 necessary for signal processing is connected, and further, an operation panel 119 including a panel switch and an X-ray irradiation switch, etc., is connected. The CPU 121 is connected to a motor driving circuit 111 which drives the arm motor 110, slit control circuits 115 and 116 which control aperture ranges of the first slit plate 106b and the second slit plate 107a, and an X-ray control circuit 118 which controls the X-ray source 106, and further, outputs a clock signal for driving the X-ray imager 107.

The X-ray control circuit 118 can feedback-control the X-ray irradiation amount onto a subject based on a signal imaged by the X-ray imager 107.

In the X-ray CT device 100 configured as described above, the X-ray imager 107 is equivalent to the photodetecting section 10, the signal readout section 20, and the controlling section 30 of the solid state imaging device 1 of the present embodiment, and a scintillator panel is provided on the front surface of the photodetecting section 10. The CPU 121 and the work memory 123 are equivalent to the correction processing section 40 of the solid state imaging device 1 of the present embodiment.

The X-ray CT device 100 includes the solid state imaging device 1 of the present embodiment, and includes the CPU 121 as an image analysis section which generates a tomographic image of a subject based on frame data after being subjected to correction processing output from the solid state imaging device, and accordingly, a tomographic image with high resolution near a defective line can be obtained. Three-dimensional image data can be generated by superimposing the frame data in the thickness direction, and according to a luminance in the frame data, a specific composition color having the luminance can be applied to a pixel having this luminance. Particularly, in the X-ray CT device, a large amount of (for example, 300) frame data is continuously acquired in a short period, and the incident light amount onto the photodetecting section 10 of the solid state imaging device 1 changes by frame, so that the amount of charges which overflow from a pixel portion on a defective line to a pixel portion on a neighboring line changes by frame. In this X-ray CT device, by providing the solid state imaging device 1 of the present invention, effective correction can be applied to frame data. The X-ray CT device 100 may include the solid state imaging device 2 instead of the solid state imaging device 1.

The invention claimed is:

1. A solid state imaging device comprising: a photodetecting section including M×N pixel portions $P_{1,1}$ to $P_{M,N}$ two-dimensionally arrayed in M rows and N columns, each including a photodiode which generates charges as much as an incident light intensity and a readout switch connected to the photodiode;

a readout wiring $L_{O,n}$ which is connected to readout switches included in the M pixel portions $P_{1,n}$ to $P_{M,n}$ of the n-th column in the photodetecting section, and reads out charges generated in a photodiode included in any of the M pixel portions $P_{1,n}$ to $P_{M,n}$ via the readout switch included in the pixel portion;

a signal readout section which is connected to readout wirings $L_{O,1}$ to $L_{O,N}$, holds voltage values corresponding to charges input through the readout wirings $L_{O,n}$, and successively outputs the held voltage values;

a controlling section which controls opening and closing operations of readout switches included in N pixel portions $P_{m,1}$ to $P_{m,N}$ of the m-th row in the photodetecting section, controls voltage value output operations in the signal readout section, and makes the signal readout section repeatedly output voltage values corresponding to the amounts of charges generated in the photodiodes included in the M×N pixel portions $P_{1,1}$ to $P_{M,N}$ in the photodetecting section as frame data, provided that M and N are integers not less than 2, m is integers not less than 1 and not more than M, n is integers not less than 1 and not more than N, m1 is an integer not less than 1 and not more than M, n1 and n2 are integers not less than 1 and not more than N, and k is an integer; and a correction processing section which acquires respective frame data repeatedly output from the signal readout section and applies correction processing thereto, wherein when any readout wiring $L_{O,n1}$ of the n1-th column among the readout wirings $L_{O,1}$ to $L_{O,N}$ is broken, the correction processing section:

defines a pixel portion which is not connected to the signal readout section due to the breakage of the readout wiring $L_{O,n1}$ among M pixel portions $P_{1,n1}$ to $P_{M,n1}$ of the n1-th column as a pixel portion $P_{m1,n1}$, and defines a pixel portion neighboring the pixel portion $P_{m1,n1}$ in the n2-th column neighboring the n1-th column as a pixel portion $P_{m1,n2}$;

corrects a voltage value $V_k$ corresponding to the pixel portion $P_{m1,n2}$ in frame data $F_k$ output k-th from the signal readout section based on voltage values $V_k$, $V_{k-1}$, and $V_{k-2}$ corresponding to the same pixel portion $P_{m1,n2}$ in the frame data $F_k$ and at least two frame data $F_{k-1}$ and $F_{k-2}$ just before the frame data $F_k$; and determines a voltage value corresponding to the pixel portion $P_{m1,n1}$ in the frame data $F_k$ based on a value after being corrected of the voltage value corresponding to the pixel portion $P_{m1,n2}$.

2. The solid state imaging device according to claim 1, wherein the correction processing section performs processing of subtracting values obtained by multiplying the voltage values $V_k$, $V_{k-1}$, and $V_{k-2}$ by coefficients from the voltage value $V_k$ corresponding to the pixel portion $P_{m1,n2}$ in the frame data $F_k$ as processing when correcting the voltage value $V_k$.

3. The solid state imaging device according to claim 2, wherein the correction processing section corrects the voltage value $V_k$ corresponding to the pixel portion $P_{m1,n2}$ in the frame data $F_k$ by setting the coefficients for each of any plurality of readout wirings among the readout wirings $L_{O,1}$ to $L_{O,N}$ when the plurality of readout wirings are broken.

4. The solid state imaging device according to claim 2, comprising:
a plurality of pairs of photodetecting sections and signal readout sections, wherein
the correction processing section obtains the coefficients, when a readout wiring of any of the columns included in any of the plurality of photodetecting sections is broken, based on voltage values of frame data corresponding to the photodetecting section.

5. An X-ray CT device comprising:
an X-ray output section which outputs X-rays toward a subject;
the solid state imaging device according to claim 1 which receives and images X-rays output from the X-ray output section and reaching through the subject;
a moving means for moving the X-ray output section and the solid state imaging device relative to the subject; and
an image analysis section which inputs frame data after being corrected output from the solid state imaging device and generates a tomographic image of the subject based on the frame data.

6. A frame data correction method for correcting frame data output from a solid state imaging device which includes:
a photodetecting section including M×N pixel portions $P_{1,1}$ to $P_{M,N}$ two-dimensionally arrayed in M rows and N columns, each including a photodiode which generates charges as much as an incident light intensity and a readout switch connected to the photodiode;
a readout wiring $L_{O,n}$ which is connected to readout switches included in the M pixel portions $P_{1,n}$ to $P_{m,n}$ of the n-th column in the photodetecting section, and reads out charges generated in a photodiode included in any of the M pixel portions $P_{1,n}$ to $P_{M,n}$ via the readout switch included in the pixel portion;
a signal readout section which is connected to readout wirings $L_{O,1}$ to $L_{O,N}$, holds voltage values corresponding to charges input through the readout wirings $L_{O,n}$, and successively outputs the held voltage values; and
a controlling section which controls opening and closing operations of readout switches included in N pixel portions $P_{m,1}$ to $P_{m,N}$ of the m-th row in the photodetecting section, controls voltage value output operations in the signal readout section, and makes the signal readout section repeatedly output voltage values corresponding to the amounts of charges generated in the photodiodes included in the M×N pixel portions $P_{1,1}$ to $P_{M,N}$ in the photodetecting section as frame data, provided that M and N are integers not less than 2, m is integers not less than 1 and not more than M, n is integers not less than 1 and not more than N, m1 is an integer not less than 1 and not more than M, n1 and n2 are integers not less than 1 and not more than N, and k is an integer, comprising,
when any readout wiring $L_{O,n1}$ of the n1-th column among the readout wirings $L_{O,1}$ to $L_{O,N}$ is broken:
defining a pixel portion which is not connected to the signal readout section due to the breakage of the readout wiring $L_{O,n1}$ among M pixel portions $P_{1,n1}$ to $P_{M,n1}$ of the n1-th column as a pixel portion $P_{m1,n1}$, and defining a pixel portion neighboring the pixel portion $P_{m1,n1}$ in the n2-th column neighboring the n1-th column as a pixel portion $P_{m1,n2}$;
correcting a voltage value $V_k$ corresponding to the pixel portion $P_{m1,n2}$ in frame data $F_k$ output k-th from the signal readout section based on voltage values $V_k$, $V_{k-1}$, and $V_{k-2}$ corresponding to the same pixel portion $P_{m1,n2}$ in the frame data $F_k$ and at least two frame data $F_{k-1}$ and $F_{k-2}$ just before the frame data $F_k$; and
determining a voltage value corresponding to the pixel portion $P_{m1,n1}$ in the frame data $F_k$ based on a value after being corrected of the voltage value corresponding to the pixel portion $P_{m1,n2}$.

7. The frame data correction method according to claim 6:
performing processing of subtracting values obtained by multiplying the voltage values $V_k$, $V_{k-1}$, and $V_{k-2}$ by coefficients from the voltage value $V_k$ corresponding to the pixel portion $P_{m1,n2}$ in the frame data $F_k$ as processing when correcting the voltage value $V_k$.

8. The frame data correction method according to claim 7:
correcting the voltage value $V_k$ corresponding to the pixel portion $P_{m1,n2}$ in the frame data $F_k$ by setting the coefficients for each of any plurality of readout wirings among the readout wirings $L_{O,1}$ to $L_{O,N}$ when the plurality of readout wirings are broken.

9. The frame data correction method according to claim 7, wherein
the solid state imaging device includes a plurality of pairs of photodetecting sections and signal readout sections, and
the frame data correction method obtaining the coefficients, when a readout wiring of any of the columns included in any of the plurality of photodetecting sections is broken, based on voltage values of frame data corresponding to the photodetecting section.

* * * * *